(12) United States Patent
Zhang et al.

(10) Patent No.: US 7,739,362 B1
(45) Date of Patent: Jun. 15, 2010

(54) METHOD AND APPARATUS FOR BROWSING A MANAGEMENT INFORMATION BASE

(75) Inventors: Hang Zhang, San Jose, CA (US); Ksai Liang, Fremont, CA (US); Dahai Li, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/496,600

(22) Filed: Feb. 2, 2000

(51) Int. Cl.
G06F 15/16 (2006.01)

(52) U.S. Cl. .............. 709/223; 709/202; 709/224; 709/232; 709/235; 370/245

(58) Field of Classification Search .......... 709/223, 709/220, 203, 224, 202, 232, 235; 370/245
See application file for complete search history.

(56) References Cited

U.S. PATENT DOCUMENTS

| | | | | |
|---|---|---|---|---|
| 5,568,471 A * | 10/1996 | Hershey et al. | ............. | 370/245 |
| 5,742,762 A * | 4/1998 | Scholl et al. | ................ | 709/200 |
| 5,907,696 A * | 5/1999 | Stilwell et al. | ................ | 703/13 |
| 5,909,550 A * | 6/1999 | Shankar et al. | ............. | 709/227 |
| 5,913,037 A * | 6/1999 | Spofford et al. | ............. | 709/226 |
| 5,926,463 A * | 7/1999 | Ahearn et al. | ................ | 370/254 |
| 5,974,237 A * | 10/1999 | Shurmer et al. | ............. | 709/224 |
| 5,987,513 A * | 11/1999 | Prithviraj et al. | ............ | 709/223 |
| 5,999,179 A * | 12/1999 | Kekic et al. | ................ | 715/734 |
| 6,003,077 A * | 12/1999 | Bawden et al. | ............. | 709/223 |
| 6,008,805 A * | 12/1999 | Land et al. | ................ | 345/335 |
| 6,018,567 A * | 1/2000 | Dulman | .................. | 379/32.03 |
| 6,085,243 A * | 7/2000 | Fletcher et al. | ............. | 709/224 |
| 6,108,782 A * | 8/2000 | Fletcher et al. | ............. | 713/153 |
| 6,122,639 A * | 9/2000 | Babu et al. | ............. | 707/103 R |
| 6,145,001 A * | 11/2000 | Scholl et al. | ................ | 709/223 |
| 6,151,023 A * | 11/2000 | Chari | ........................ | 715/854 |
| 6,272,537 B1 * | 8/2001 | Kekic et al. | ................. | 709/223 |
| 6,292,838 B1 * | 9/2001 | Nelson | .................... | 709/236 |
| 6,324,646 B1 * | 11/2001 | Chen et al. | ..................... | 726/6 |
| 6,332,142 B1 * | 12/2001 | LeBlanc | ..................... | 707/100 |
| 6,360,255 B1 * | 3/2002 | McCormack et al. | ....... | 709/221 |
| 6,363,421 B2 * | 3/2002 | Barker et al. | ................ | 709/223 |
| 6,389,464 B1 * | 5/2002 | Krishnamurthy et al. | .... | 709/220 |
| 6,430,595 B1 * | 8/2002 | Ferguson et al. | ............ | 709/200 |
| 6,490,620 B1 * | 12/2002 | Ditmer et al. | ............... | 709/224 |
| 6,529,894 B1 * | 3/2003 | Haeri et al. | .................... | 707/1 |
| 6,532,241 B1 * | 3/2003 | Ferguson et al. | ............ | 370/469 |

(Continued)

*Primary Examiner*—Alina N. Boutah
(74) *Attorney, Agent, or Firm*—Hickman Palermo Truong & Becker LLP

(57) ABSTRACT

A method and apparatus are disclosed for browsing one or more Management Information Base (MIB) objects that are stored in a network device, such as a router or switch. In one embodiment, the network device receives a connection of a Web browser at an HTTP daemon and further receives a request from the Web browser to obtain the current value of the MIB variable. The request may be sent in a Hypertext Transfer Protocol (HTTP). The HTTP daemon passes the request to an HTTP-SNMP interface. The HTTP-SNMP interface creates an SNMP query for the current value of the MIB variable and sends the query to an SNMP daemon of the network device. The SNMP daemon obtains the current value of the variable from a MIB of the network device. The network device then returns the current value of the MIB variable to the Web browser which can display it.

44 Claims, 8 Drawing Sheets

U.S. PATENT DOCUMENTS

| | | | |
|---|---|---|---|
| 6,535,505 B1 * | 3/2003 | Hwang et al. | 370/352 |
| 6,546,415 B1 * | 4/2003 | Park | 709/202 |
| 6,560,196 B1 * | 5/2003 | Wei | 370/230.1 |
| 6,571,285 B1 * | 5/2003 | Groath et al. | 709/223 |
| 6,584,108 B1 * | 6/2003 | Chung et al. | 370/401 |
| 6,636,499 B1 * | 10/2003 | Dowling | 370/338 |
| 6,654,796 B1 * | 11/2003 | Slater et al. | 709/220 |
| 6,662,208 B1 * | 12/2003 | Moeller et al. | 709/203 |
| 6,704,284 B1 * | 3/2004 | Stevenson et al. | 370/241 |
| 6,717,914 B1 * | 4/2004 | Hamami | 370/248 |
| 6,728,748 B1 * | 4/2004 | Mangipudi et al. | 718/105 |
| 6,779,031 B1 * | 8/2004 | Picher-Dempsey | 709/224 |
| 6,985,901 B1 * | 1/2006 | Sachse et al. | 707/10 |
| 7,339,924 B1 * | 3/2008 | Chung et al. | 370/356 |

* cited by examiner

METHOD AND APPARATUS FOR BROWSING A MANAGEMENT INFORMATION BASE

FIELD OF THE INVENTION

The present invention generally relates to managing a computer network. The invention relates more specifically to methods and apparatus for obtaining values of Management Information Base (MIB) variables stored in a network device.

BACKGROUND OF THE INVENTION

Computer networks consisting of end stations, routers, hubs, switches, gateways, firewalls, and other network devices are in widespread use. Management and support issues are perhaps the most difficult issues to grapple with in networked computing. The upside is that the benefits of networks are real—lower hardware and software costs, more flexible systems, easier to use front-ends. Unfortunately, administration and support is more costly than for centralized systems. Networked computing often disperses network devices across a wide geographic area and creates time-consuming problems for network administrators concerned with keeping these systems running.

Several conventional standards are available to administrators for managing networks and systems. One such standard is Simple Network Management Protocol (SNMP), which is currently the most widely implemented protocol for management of network devices such as routers, hubs and switches. SNMP performs relatively simple management of the components in a network. SNMP uses object-oriented techniques to describe the information to be managed. Each piece of information to be managed is called a managed object. The managed objects can represent anything that needs to be managed, for example, an entire host, a program, or a variable maintaining a counter of Transmission Control Protocol (TCP) packets.

A Management Information Base (MIB) defines a structured collection of the managed objects. This structured collection of managed objects is commonly referred to as a MIB tree, which is a hierarchical data base with names and variables for each object component within the tree. Objects are defined by their hierarchical location in the MIB tree. For example, the IP object group is defined by the location value 1.3.6.1.2.1.4. This number is referred to as a MIB variable. A new object and its corresponding MIB variable is always added in the tree "down and to the right." SNMP is the protocol used to set values and retrieve values of MIB variables.

FIG. 1 shows a conventional network system. A local area network (LAN) 103 is protected from a separate public or untrusted network 100 by a firewall 102, which is a gateway device that is configured or programmed to control access to network 103 of devices coupled to network 100. The network 100 may be, for example, the global, packet-switched internetwork known as the Internet, a wide area network (WAN), etc.

LAN 103 includes one or more network devices 106, 108. Each network device is a router, switch, hub, etc., that is coupled to one or more servers, printers, workstations, personal computers, or other end station devices. There may be multiple LANs 103 connected to the Network 100. Although FIG. 1 depicts only two network devices 106, 108 in a practical system there may be hundreds or thousands of network devices, distributed over a wide geographic area, and many network management systems 104.

A MIB 110 is stored in and managed by each of the network devices 106, 108. Each MIB 110 stores values of MIB variables that pertain to the associated network device 106, 108.

A network management system (NMS) 104 manages the network devices 106, 108 by, among other things, collecting information from the MIBs 110, processing the MIB information, and presenting it to a user or display device. As mentioned above, SNMP is typically the protocol for doing such managing. NMS 104 comprises one or more software program elements that manage one or more local databases of network management information. An example of a commercial product that is suitable for use as NMS 104 is Resource Manager Essentials, commercially available from Cisco Systems, Inc., San Jose, Calif.

As an example of NMS processing, a MIB engine in the NMS provides active background daemons that monitor current values of network device MIB variables as compared to historical data in order to identify trends and unusual developments in the network devices. From the NMS, triggers can be used to launch corrective actions in the network devices 106, 108. Since a portion of the management data is maintained by the network devices themselves and stored in the MIBs, data of interest may be spread on MIBs 110 throughout the network system. The NMS 104 maintains aggregate snapshots of this distributed data. However, the data stored by the NMS 104 is not as up-to-date as the data in the MIBs.

The primary value of SNMP comes from the MIB data it manages. In practice, the primary value of SNMP comes from the ability to navigate through MIB trees and to understand the MIB vocabularies. Unfortunately, there is nothing simple about MIBs or their arcane vocabularies. MIBs are not very human-friendly as they have been designed to be used by applications.

Moreover, MIBs are typically accessible by humans only through NMS terminals, which are not always convenient for administrators. The conventional NMS features do not provide human-friendly tools for accessing MIB variables. NMS tools, for example, typically do not present to the network administrator the MIB variables in an organized format, such as a MIB tree, which was discussed above. Only the most experienced network administrators can make sense of the multitude of MIB variables within a MIB. In other cases, NMS functions that retrieve and set values of MIB variables are embedded in the NMS software and cannot be used to selectively retrieve values of MIB variables that interest a particular user.

Thus, there is a need for a method and apparatus that makes objects in MIB trees more accessible to human users. More specifically, there is a need for tools to make MIBs more accessible and thereby reduce the number of costly problems that administrators must deal with on a daily basis in keeping their network systems running.

In particular, there is a need for a method and apparatus that enables a human user to view values of MIB variables through means other than a network management system.

SUMMARY OF THE INVENTION

The foregoing needs and objects, and other needs and objects that will become apparent from the following description, are achieved by the present invention, which comprises, in one aspect, a method for obtaining a current value of a Management Information Base (MIB) variable stored in a network device in a network. The network device receives a connection of a Web browser. The network device further receives a request from the Web browser to obtain the current value of the MIB variable, wherein the request is sent in a Hypertext Transfer Protocol (HTTP). The network device then receives the current value of the MIB variable from a MIB of the network device. The network device then returns the current value of the MIB variable to the Web browser.

In another embodiment, a network device is disclosed. The network device includes a communication interface for electronically connecting the network device to a network; a Simple Network Management Protocol (SNMP) daemon electronically connected to the communication interface; a Management Information Base (MIB) electronically connected to the SNMP daemon; a Hypertext Transfer Protocol (HTTP) daemon, the HTTP daemon being configured to receive a request from a Web browser to obtain a value of a MIB variable, wherein the HTTP daemon is electronically connected to the SNMP daemon and the communication interface; and an internetworking operating system (IOS) electronically connected to the interface, the HTTP daemon, and the SNMP daemon.

In still another embodiment, the a computer-readable medium is disclosed that carries one or more sequences of one or more instructions for obtaining a current value of a Management Information Base (MIB) variable stored in a network device in a network, the one or more sequences of one or more instructions including instructions which, when executed by one or more processors, cause the one or more processors to perform method steps. The method steps include receiving a connection of a Web browser to the network device; receiving a request from the Web browser to obtain the current value of the MIB variable, wherein the request is sent in a Hypertext Transfer Protocol (HTTP); receiving the current value of the MIB variable from a MIB of the network device; and returning the current value of the MIB variable to the Web browser.

Advantageously, the present invention provides a more convenient and efficient technique for browsing MIBs. The network administrator no longer has to deal with cryptic NMS terminals to access MIB variables. Further, other embodiments, disclosed in detail below, illustrate how the present invention provides valuable memory saving to network devices.

The invention encompasses other embodiments of a method, an apparatus, and a computer-readable medium, which are configured as set forth above and with other features and alternatives.

DETAILED DESCRIPTION OF THE PREFERRED EMBODIMENT

A method and apparatus for browsing a Management Information Base (MIB) is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

Figure 1:
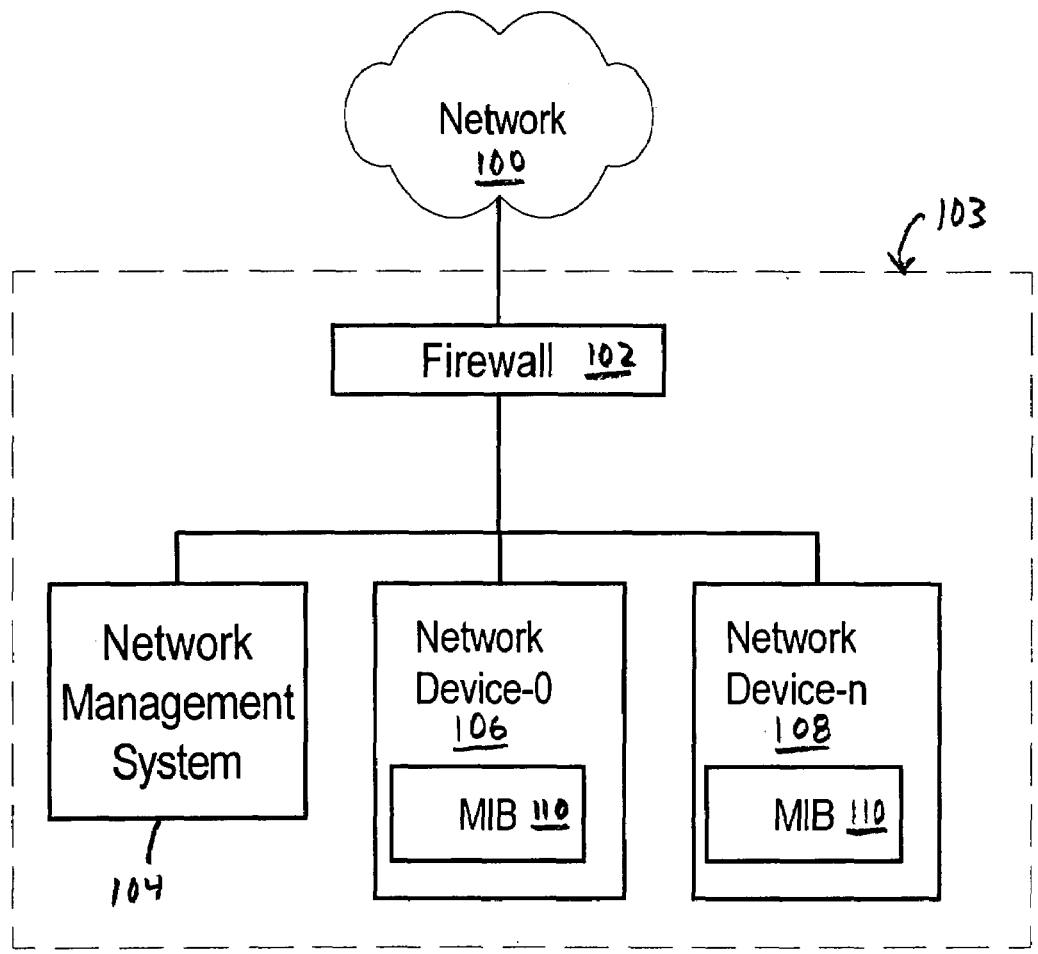
FIG. 1 is a block diagram of an example of a conventional network system.
Figure 2:
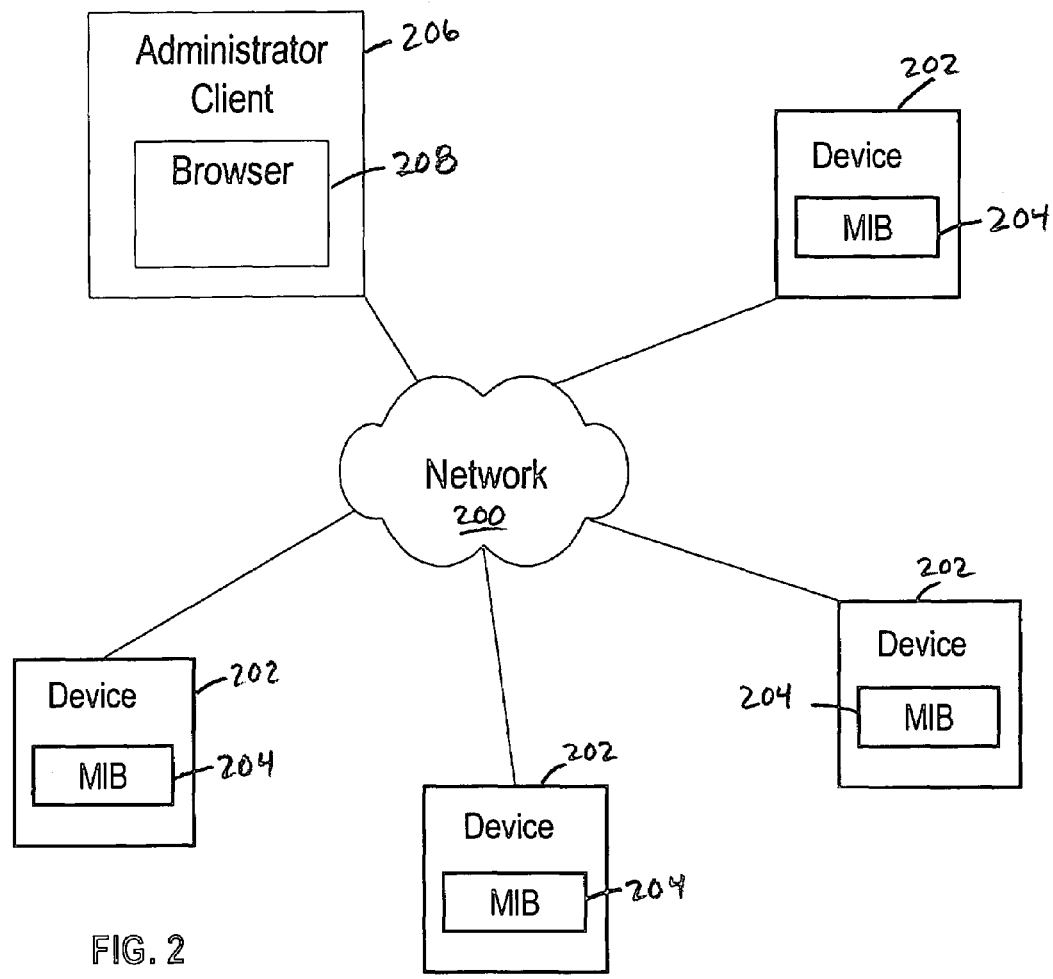
FIG. 2 is a block diagram of a view of a network system in which the invention may be implemented.

FIG. 2 shows a high-level view of a network system in which the present invention may be implemented.

An administrator client 206 communicates with one or more network devices 202 through network 200. The administrator client 206 is any network node, such as an end station device, including a workstation, personal computer, etc. Network 200 is any communication network, or internetwork, including a LAN, WAN, the global packet-switched network known as the Internet, etc. Network devices include, for example, switches, routers, bridges, gateways, and other devices.

Each device 202 stores its current configuration, and other information, in a Management Information Base (MIB) 204. Information in a MIB 204 is organized in one or more MIB trees of one or more MIB variables. The administrator client 206 can send fetch and set commands (or SNMP queries) to a device 202 to retrieve or set values of MIB variables. Examples of MIB variables include SysObjID or SysOID. MIB structures and functions are described in detail in D. Perkins et al., "Understanding SNMP MIBs" (Upper Saddle River, N.J.: Prentice-Hall, 1997).

Preferably, the administrator client 206 is a general-purpose computer system that runs one or more network management software programs or processes. SNMP queries are created and communicated to the devices using a Web browser 208 in the administrator client 206. Communications between the administrator client 206 and each network device are preferably handled in a protocol that includes Transmission Control Protocol/Internet Protocol (TCP/IP) and Hypertext Transfer Protocol (HTTP). Accordingly, information (e.g., MIB variables) from a network device that is to be displayed at the administrator client is preferably packaged in one or more Hypertext Markup Language (HTML) pages.

The Web browser 208 is preferably hosted on the administrator client 206, which is electronically connected to the network 200. Using the Web browser 208, a network manager can monitor and control network components. As an example, through the Web browser, a manager can obtain values of MIB variables from each MIB 204. Further, an administrator may also interrogate devices such as host computers, routers, switches, and bridges to determine their status, and to obtain statistics about the networks to which they attach. The administrator client 206 may also enable a manager to control such devices by changing routes and configuring network interfaces.

Structural Overview

Figure 3:
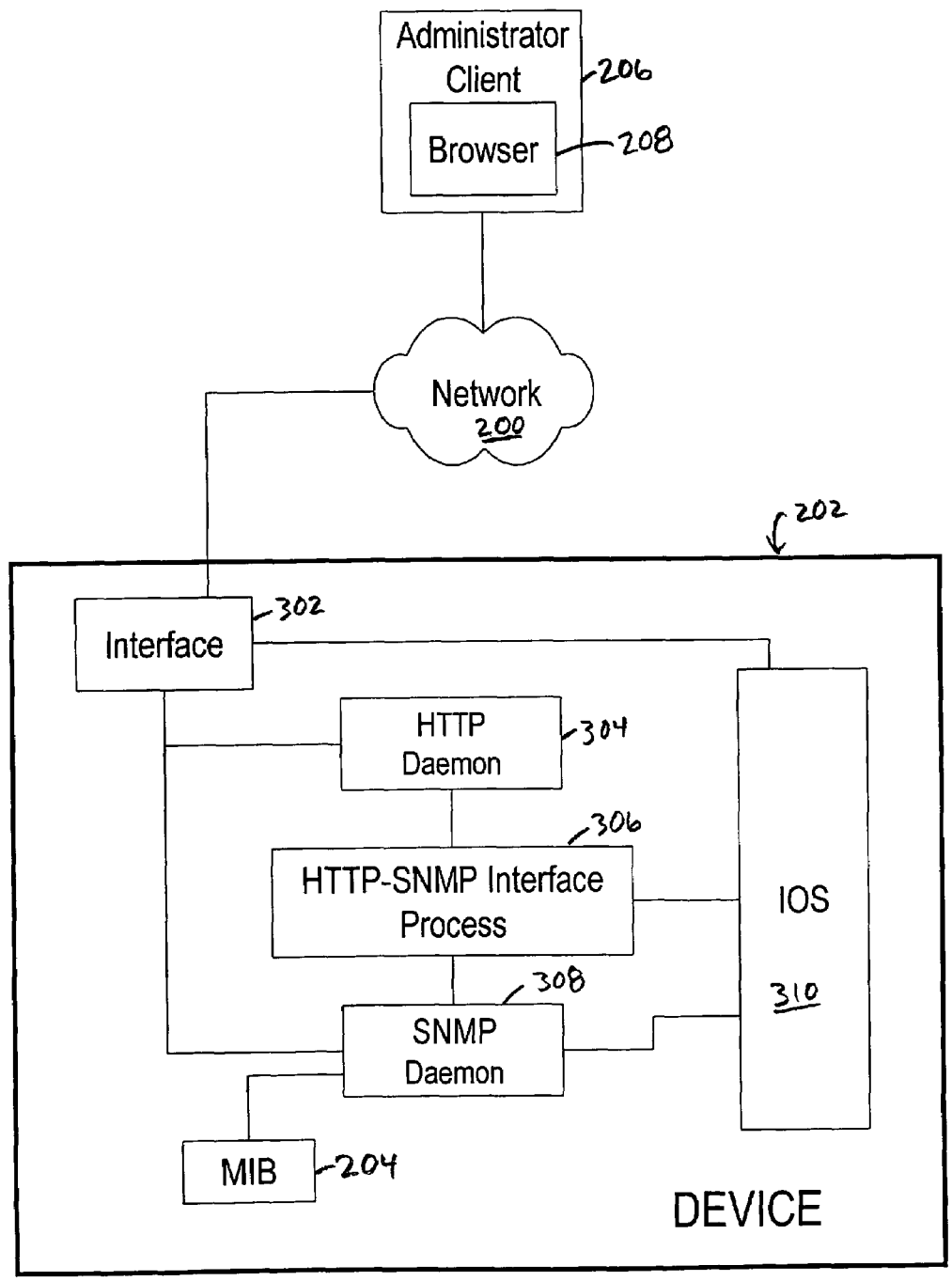
FIG. 3 is a block diagram of a view of a network device having a middle layer for creating SNMP queries.

FIG. 3 is a block diagram of a network device 202 having an HTTP-SNMP Interface Process 306 for creating SNMP queries and communicating HTTP information.

The network device 202 includes a communication interface 302 that couples the network device 202 to the network 200. Preferably, a Simple Network Management Protocol (SNMP) daemon 308 couples the communication interface 302 to MIB 204. A Management Information Base (MIB) 204 is coupled to the SNMP daemon 308.

The network device 202 also includes a Hypertext Transfer Protocol (HTTP) daemon 304 that is coupled between the interface 302 and HTTP-SNMP Interface 306. HTTP daemon 304 is configured to receive a request from the Web browser 208 to obtain a value of a MIB variable in the MIB 204. The HTTP daemon 304 is coupled to the communication interface 302.

HTTP-SNMP Interface Process 306 is coupled logically between the HTTP daemon 304 and the SNMP daemon 308. Internetworking operating system (IOS) 310 supervises and controls execution of HTTP daemon 304, HTTP-SNMP Interface Process 306, and SNMP daemon 308. Each of the HTTP daemon 304, HTTP-SNMP Interface Process 306, and SNMP daemon 308 may be implemented as one or more software programs or processes.

In one embodiment, the HTTP-SNMP Interface Process 306 is configured to receive a request from a network manager or network management system associated with the administrator client 206. In response to receiving a request, HTTP-SNMP Interface Process 306 retrieves a stored, pre-defined HTML template. The HTTP-SNMP Interface Process 306 has a mechanism for adding to the template a logical representation of the MIB tree that is stored in the memory of the network device. The completed template consists of a tree of links, in which each link is associated with either another Web page representing the next lower branch of the MIB tree, or a MIB variable. The HTTP-SNMP Interface Process 306 returns the completed template to the Web browser 208. When one of the links is selected, HTTP-SNMP Interface Process 306 cooperates with SNMP daemon 308 to retrieve the Web page or MIB variable value associated with the selected link. Thus, upon request, Web browser 208 can display the MIB object tree by retrieving and displaying a Web page based on the HTML template.

Since the MIB object tree organizes the MIB object variables into a hierarchical structure that is easy to browse through and easy to understand, this process facilitates review of MIB variable values.

The HTTP-SNMP Interface Process 306 is also configured to create SNMP queries, for example, from commands received from a network manager at the administrator client 206. Further, the HTTP-SNMP Interface Process 306 is configured to send the SNMP queries to the SNMP daemon 308.

The SNMP daemon 308 is configured to obtain the current value of the requested MIB variable from the MIB 204. The SNMP daemon 308 is also configured to send the appropriate MIB variable values back to the HTTP-SNMP Interface Process 306. In one embodiment, the HTTP-SNMP Interface Process 306 is further configured to put the MIB variable values into an HTML page and forward the HTML page to the HTTP daemon. The HTTP-SNMP Interface Process 306 organizes the MIB variable values into a human-friendly structure that is easy to understand and easy to browse.

The network manager may request one MIB variable at a time. Accordingly, the HTTP daemon is configured to send HTML pages containing the MIB variables to the administrator client 206 to be displayed in the Web browser 208.

The foregoing represents one embodiment of the HTTP-SNMP Interface Process 306. Generally, the HTTP-SNMP Interface Process 306 provides at least (1) a mechanism to build a MIB tree in the memory of the network device 202 and (2) a translator between HTML queries and SNMP queries.

Figure 4:
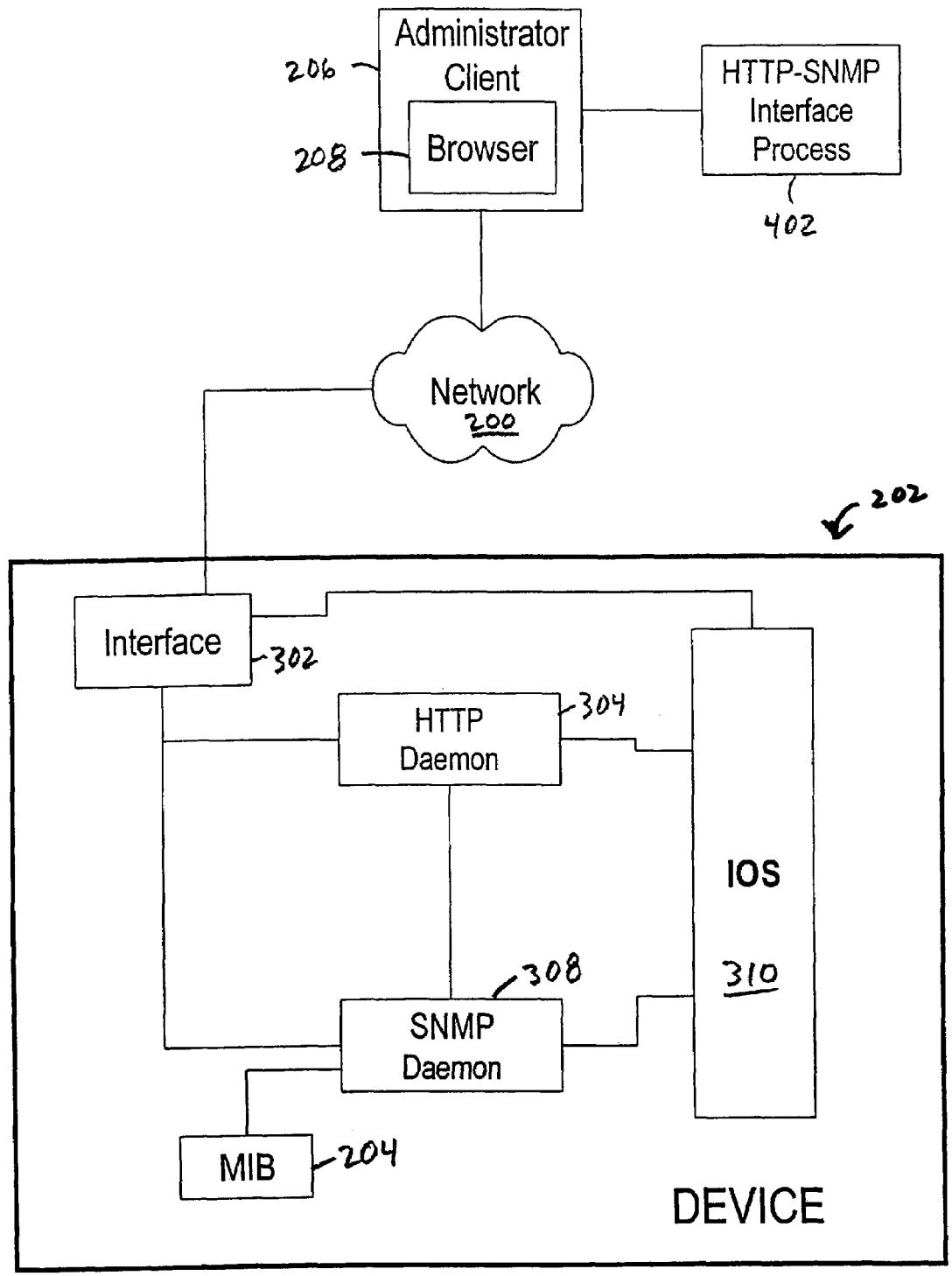
FIG. 4 is a block diagram of a view of a network device, wherein a plug-in or Java applet is implemented in an administrator client.

FIG. 4 is a block diagram of another embodiment of a network device 202.

In the embodiment of FIG. 4, an HTTP-SNMP Interface Process 402 is implemented in the form of a process that is associated with browser 208 of administrator client 206. For example, HTTP-SNMP Interface Process 402 may be implemented in the form of a Web browser plug-in software application, Java applet, ActiveX control, etc. HTTP-SNMP Interface Process 402 has functionality generally equivalent to that of HTTP-SNMP Interface Process 306 of FIG. 3.

As in FIG. 3, network device 202 includes a communication interface 302 that couples the network device 202 to the network 200. A Simple Network Management Protocol (SNMP) daemon 308 is coupled to the communication interface 302. A Management Information Base (MIB) 204 is coupled to SNMP daemon 308.

The network device 202 also includes a Hypertext Transfer Protocol (HTTP) daemon 304 that is configured to receive a request from the Web browser 208 to obtain a value of a MIB variable. The HTTP daemon 304 is coupled to the communication interface 302.

The administrator client 206 may obtain HTTP-SNMP Interface Process 402 in several ways. In one exemplary embodiment, HTTP-SNMP Interface Process 402 is a plug-in or Java applet 402 that a network manager obtains from a server coupled to the Internet. Alternatively, administrator client 206 obtains HTTP-SNMP Interface Process 402 from a network management station that is coupled to network 200. When HTTP-SNMP Interface Process 402 is obtained by the administrator client 206 in plug-in form, the plug-in is loaded into the administrator client 206 and executed within browser 208.

Alternatively, browser 208 may automatically download a Java applet from a Web page or Java archive (JAR) file. The Web page may be located, for example, in a memory of the network device or at an external Web site, but the embodiment is not so limited. The browser loads the applet into the administrator client's memory, and then executes it. The browser deletes the applet from memory when it exits the Web page that uses the applet. Use of Java applets is described in detail in R. Orfali et al., "Client/Server Survival Guide" (Wiley Computer Publishing, 1999).

HTTP-SNMP Interface Process 402 comprises one or more Web pages and tools to allow a network manager to browse through the MIB variables on the network device 202. Accordingly, the plug-in or Java applet 402 may be configured to create SNMP queries as needed. The plug-in or Java applet 402 may be configured to package the SNMP query in an HTTP request and send the packaged request to the network device 202.

HTTP daemon 304 is configured to respond to the packaged request by unpackaging the SNMP query and forwarding the SNMP query to the SNMP daemon 308. Accordingly, the SNMP daemon 308 is configured to look up a value for each MIB variable that is identified in the query, and return the MIB variable value to the HTTP daemon 304. HTTP daemon 304 is further configured to package the MIB variable value in an HTML page and send the HTML page back to the administrator client 206. At administrator client 206, HTTP-SNMP Interface Process 402 is configured to display the HTML page in the Web browser 208. As a result, the value of the requested MIB variable is displayed using the Web browser.

In one specific embodiment, the HTTP-SNMP Interface Process 402 is configured to receive a request from a network manager or network management system associated with the administrator client 206. In response to receiving a request, HTTP-SNMP Interface Process 402 retrieves a pre-defined HTML template that is stored in association with administrator client 206 or that forms part of HTTP-SNMP Interface Process 402. The HTTP-SNMP Interface Process 402 has a mechanism for adding to the template a logical representation of the MIB tree that is stored in the memory of the network device. The completed template consists of a tree of links, in which each link is associated with either another Web page representing the next lower branch of the MIB tree, or a MIB variable. The HTTP-SNMP Interface Process 402 returns the completed template to the Web browser 208.

When one of the links is selected, HTTP-SNMP Interface Process 402 packages an appropriate SNMP query, and sends the query to network device 202 in an HTTP request. The query is communicated from interface 302 to HTTP daemon 304, which parses the HTTP request and obtains the SNMP query. HTTP daemon 304 then sends the SNMP query to SNMP daemon 308, which retrieves the MIB variable value associated with the query. SNMP daemon 308 returns the MIB variable value to HTTP daemon 304, which creates an HTTP response message that contains the MIB variable value, and sends the HTTP response message through network 200 to HTTP-SNMP Interface Process 402. The HTTP-SNMP Interface Process 402 places the MIB variable value in the HTML template and passes the completed template to browser 208, which displays it. Thus, upon request, Web browser 208 can display the MIB object tree by retrieving and displaying a Web page based on the HTML template.

Process Overview

Figure 5:
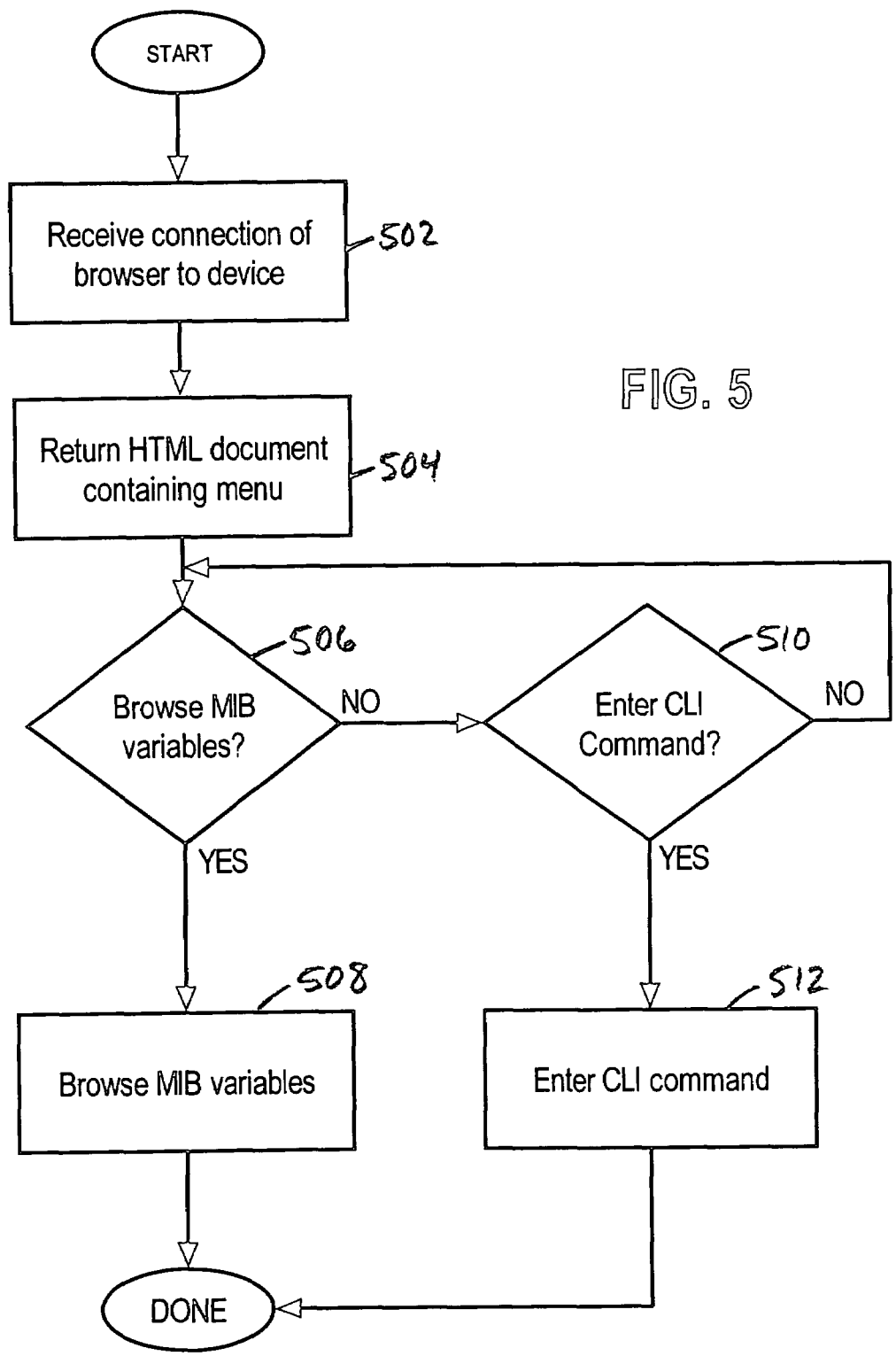
FIG. 5 is a flowchart of a method for browsing MIB variables in a network device.

FIG. 5 is a flowchart of an embodiment of a method for browsing MIB variables in a network device.

The method starts in step 502 in which a connection of a browser to a device is received. For example, network device 202 receives a connection from Web browser 208. A user associated with administrator client 206 or another end station may access the network device by inputting into the browser a Unified Resource Locator (URL) that identifies the network device. The URL is associated with an Internet Protocol (IP) address for the particular network device.

The network device responds in step 504 by returning an HTML document containing a menu. For example, HTTP daemon 304 retrieves from device memory an HTML document that contains two hyperlinks. One hyperlink identifies a Browse MIB Variables option and the other hyperlink identifies an Enter CLI Command option. In this context, "CLI" means "Command Line Interface" and refers to the text command language that is used to input commands to many network devices. Other hyperlinks associated with other options may be provided in other embodiments. The menu is displayed on the Web browser.

In step 506, a determination is made whether the user (e.g., network manager) wants to browse MIB variables. In one embodiment, step 506 involves receiving a user selection of one of the choices displayed to the user using the menu of step 504, for example, by receiving a user selection of one of the hyperlinks in the menu.

If the user decides not to browse MIB variables, as indicated by a user selection of the Enter CLI Command hyperlink, control is transferred to decision step 510, where it is determined whether the user wishes to enter a CLI command. For example, block 510 represents receiving user selection of the Enter CLI Command hyperlink. If the user does not want to enter a CLI command, then control is transferred to block 506 to await a user selection of one of the menu options. If, on the other hand, the user decides to enter a CLI command, control is transferred to step 512, in which a CLI command is entered. Block 512 may involve, for example, receiving a CLI command from a sequence of keyboard characters that are entered by the user or received from another process.

If the user decides to browse MIB variables, as determined by block 506, then control proceeds to step 508, in which one or more MIB variable values are browsed.

Figure 6:
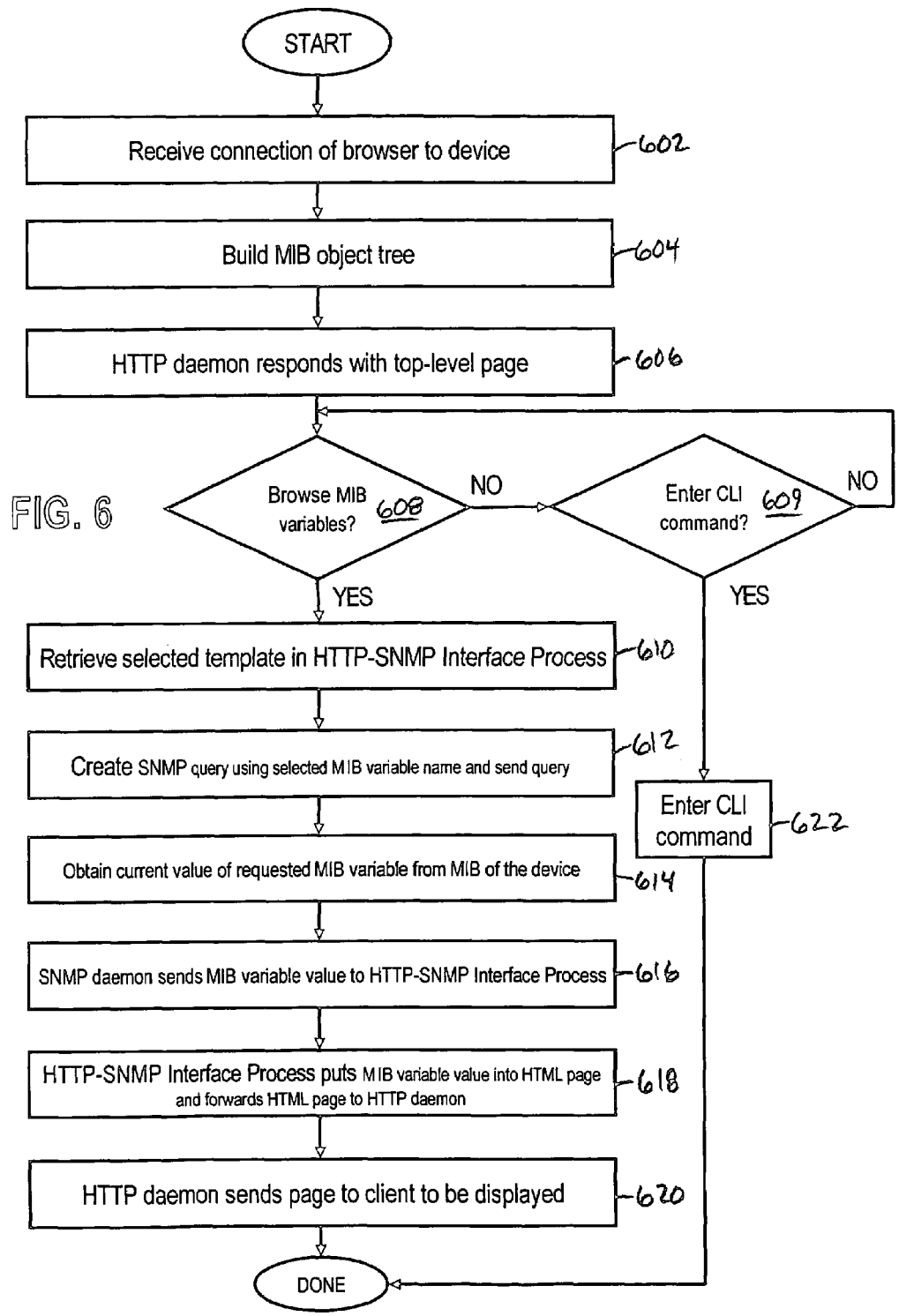
FIG. 6 is a flowchart of a method for browsing MIB variables in a network device, wherein the network device has a middle layer for creating SNMP queries.

FIG. 6 is a flowchart of a method for browsing MIB variables in a network device. Steps in the method of FIG. 6 may be used to implement step 508 of FIG. 5. Both the methods of FIG. 5 and FIG. 6 may be implemented in one or more computer programs or processes. In a preferred embodiment, the method of FIG. 6 is carried out using a network device has a middle layer for creating SNMP queries.

In step 602, a connection of a Web browser is received. For example, in one embodiment, the HTTP daemon of network device 202 receives a connection of Web browser 208. In step 604, a MIB object tree is created and stored. For example, in one embodiment, network device 202 creates and stores an MIB object tree in its memory. In step 606, an HTTP daemon in the network device responds by providing a top-level Web page for display by a Web browser.

In decision step 608, the process determines whether MIB variables are to be browsed. For example, step 608 involves receiving a user selection of a hyperlink in the Web page that is provided in step 606 and determining whether the hyperlink is associated with browsing MIB variables. If the user selection is not associated with browsing MIB variables, then control is passed to decision step 609, where the process determines whether a CLI command is to be entered. For example, step 609 involves receiving a user selection of a hyperlink that is associated with an option for entering a CLI command. If the result of step 609 is negative, no user selection has been received, and therefore control is passed back to step 608 to await a user selection. If, on the other hand, the user selects a hyperlink that indicates that the user wishes to enter a CLI command, then control passes to step 622 at which point the user may enter a CLI command.

Referring again to step 608, if a user selection is received that indicates browsing MIB variables, then control passes to step 610, in which a document template is retrieved by a HTTP-SNMP Interface Process of the device. As discussed above with reference to FIG. 3, preferably the template is an HTML template and includes hyperlinks representing a tree of the MIB objects that is created and stored in the memory of the network device. Each hyperlink is associated with a template of a page at a subordinate level of the object tree or with a particular MIB object. Step 610 may also involve receiving a user selection of one of the hyperlinks and, when the selected hyperlink is associated with a template of a page at a subordinate level of the object tree, successively displaying other subordinate pages of the tree.

In step 612, the HTTP-SNMP Interface Process creates an SNMP query using the name of the selected MIB variable. The HTTP-SNMP Interface Process then sends the SNMP query to an SNMP daemon of the device. In step 614, the SNMP daemon obtains the current value of the requested MIB variable from a MIB in the device.

In step 616, the SNMP daemon sends the appropriate MIB variable value to the HTTP-SNMP Interface Process. In step 618, the HTTP-SNMP Interface Process puts the MIB variable into an HTML page and forwards the HTML page to the HTTP daemon. In step 620, the HTTP daemon sends the HTML page to the connected client in order to be displayed.

Figure 7:
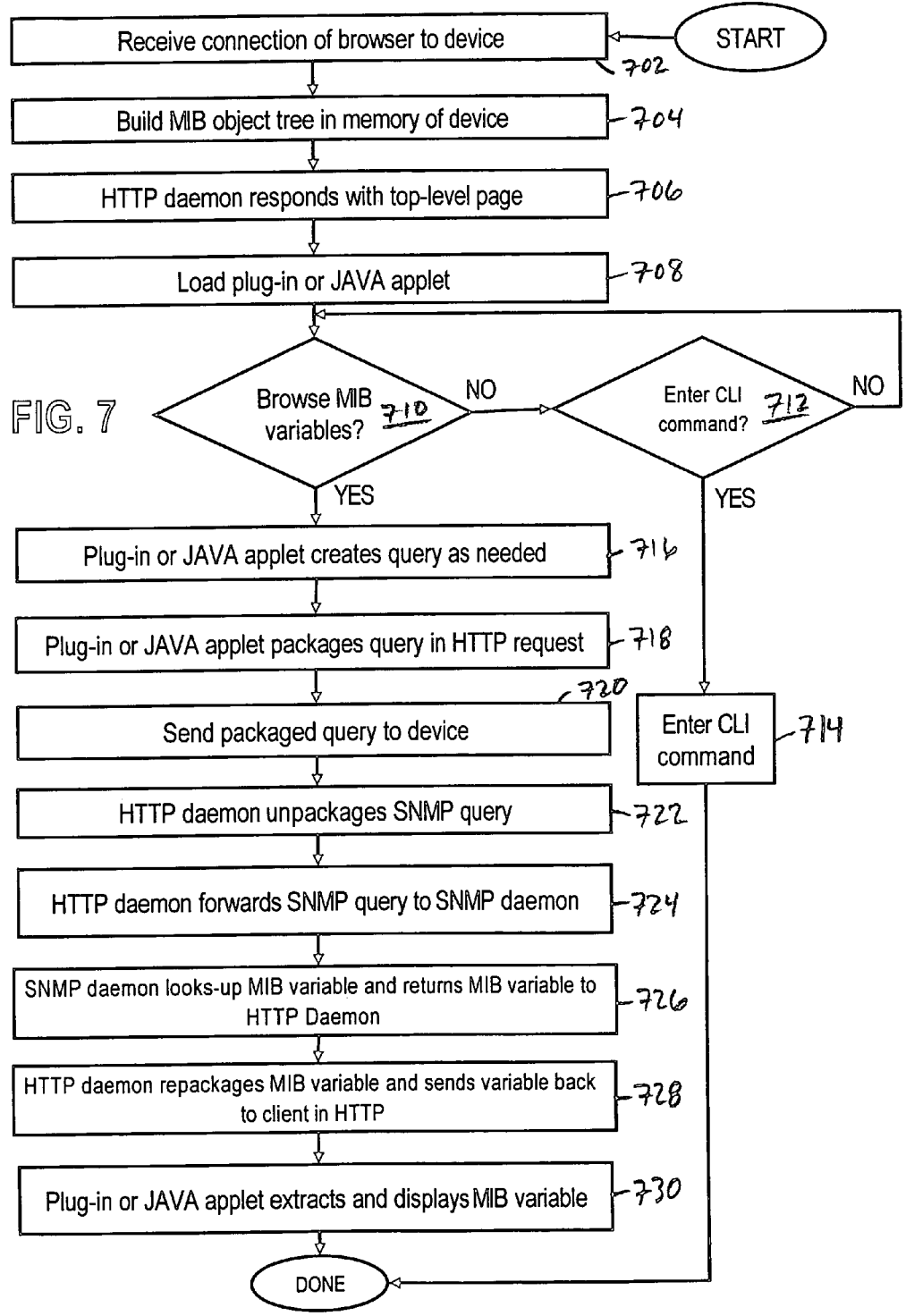
FIG. 7 is a flowchart of a method for browsing MIB variables in a network device, wherein a plug-in or Java applet is implemented in the administrator client.

FIG. 7 is a flowchart of a method for browsing MIB variables in a network device, wherein a plug-in or Java applet implements certain functions.

In step 702, a network device receives a connection from a Web browser. In step 704, a MIB object tree is created and stored in the memory of the network device. In step 706, an HTTP daemon responds with a top-level page. In step 708, a plug-in or Java applet is loaded into a memory.

In a decision step 710, it is determined whether MIB variables are to be browsed. If not, then in decision step 712, it is determined whether a CLI command is to be entered. If so, then in step 714, a CLI command is entered.

Referring again to decision step 710, MIB variables are to be browsed, then control proceeds to step 716, in which the plug-in or Java applet creates a query for a selected MIB variable. In step 718, the plug-in or Java applet packages the query in an HTTP request.

In step 720, the network device receives the packaged request. In step 722, the HTTP daemon of the network device unpackages the SNMP query in order to identify the MIB variable that is being requested. In step 724, the HTTP daemon forwards the SNMP query to the SNMP daemon.

In step 726, the SNMP daemon looks up the MIB variable in a MIB of the network device. The SNMP daemon then returns the appropriate MIB variable to the HTTP daemon. In step 728, the HTTP daemon repackages the MIB variable in an HTTP reply message and sends the reply message, for example, back to the administrator client. In step 730, the plug-in or Java applet extracts the MIB variable value from the HTTP reply message and display the value.

As a result, MIB variable values of a network device are easily browsed and displayed using a Web browser and without the need for a specialized network management station.

Hardware Overview

Figure 8:
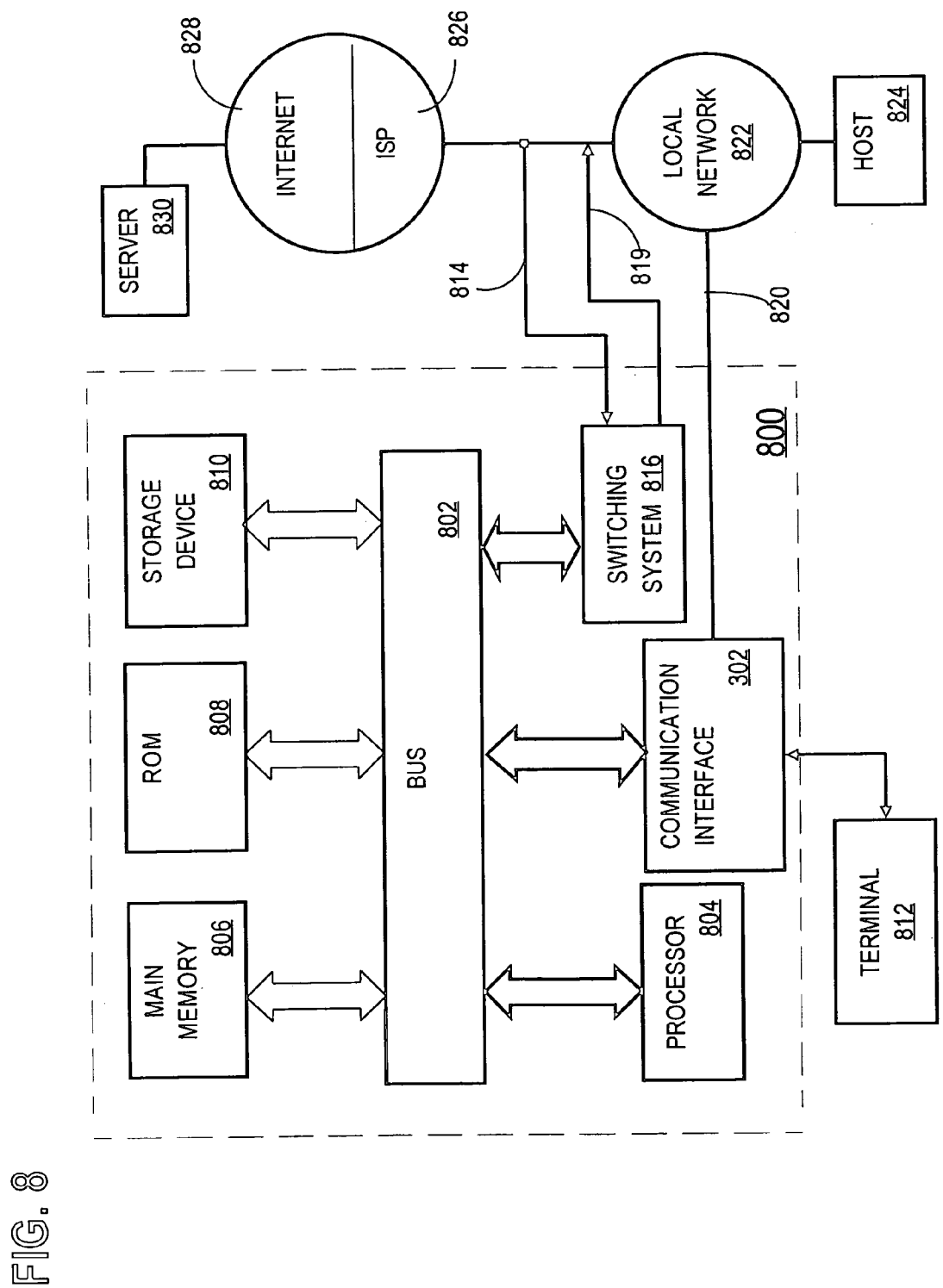
FIG. 8 is a block diagram that illustrates a computer system upon which an embodiment of the invention may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 302 may be coupled to bus 802 for communicating information and command selections to processor 804. Interface 302 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for the techniques and functions described herein in a network system. According to one embodiment of the invention, such techniques and functions are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 302 also provides a two-way data communication coupling to a network link 820 that is connected to a local network 822. For example, communication interface 302 may be an integrated services digital network (ISDN) card or a modem to provide a data communication connection to a corresponding type of telephone line. As another example, communication interface 302 may be a local area network (LAN) card to provide a data communication connection to a compatible LAN. Wireless links may also be implemented. In any such implementation, communication interface 302 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 302, which carry the digital data to and from computer system 800, are exemplary forms of carrier waves transporting the information.

Computer system 800 can send messages and receive data, including program code, through the network(s), network link 820 and communication interface 302. In the Internet example, a server 830 might transmit a requested code for an application program through Internet 828, ISP 826, local network 822 and communication interface 302. In accordance with the invention, one such downloaded application provides for the techniques and functions that are described herein.

The received code may be executed by processor 804 as it is received, and/or stored in storage device 810, or other non-volatile storage for later execution. In this manner, computer system 800 may obtain application code in the form of a carrier wave.

Scope

In this disclosure, including in the claims, certain process steps are set forth in a particular order, and alphabetic and alphanumeric labels may be used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for obtaining a current value of a Management Information base (MIB) variable stored in a managed network device in a network packet router, the method comprising the steps of:

receiving a connection of a Web browser to a network packet router;

receiving at the network packet router an HTTP request message from the browser to obtain the current value of the MIB variable from the network packet router to which the MIB variable value pertains;

creating, at the network packet router, based on the HTTP request message, an SNMP query that requests the current value of the MIB variable;

communicating the SNMP query to an SNMP daemon of the network packet router;

receiving, from the SNMP daemon in response to communicating the SNMP query to the SNMP daemon, the current value of the MIB variable from the MIB of the network packet router to which the MIB variable value pertains; and communicating the current value of the MIB variable from the network packet router to which the MIB variable value pertains to the browser using an HTTP reply message.

2. The method of claim 1, further comprising the steps of:

creating and storing a MIB object tree in a memory of the network packet router;

creating an electronic document that contains a representation of one or more MIB variables of the MIB object tree;

communicating the electronic document to the Web browser.

3. The method of claim 1, wherein the step of receiving the current value of the MIB variable from the MIB of the network packet router includes the steps of creating and storing a MIB object tree in a memory of the network packet router; obtaining the MIB variable from the MIB object tree in the memory of the network packet router.

4. The method of claim 1, further comprising the steps of:

creating and storing a MIB object tree in a memory of the network packet router;

creating an electronic document that contains a representation of one or more MIB variables of the MIB object tree;

receiving a user selection of one of the MIB variables based on the electronic document;

wherein the step of receiving the current value of the MIB variable from the MIB of the network packet router includes the step of obtaining the MIB variable that is identified in the user selection from the MIB object tree in the memory of the network packet router.

5. The method of claim 1, further comprising the steps of:

receiving the HTTP request message to obtain the current value of the MIB variable at an HTTP-SNMP interface;

creating an SNMP query that requests a current value of the MIB variable based on the HTTP request message; and communicating the SNMP query to an SNMP daemon of the network packet router.

6. The method of claim 1, further comprising the steps of:

communicating the current value of the MIB variable to an HTTP-SNMP interface;

creating and storing an HTML page that contains the current value of the MIB variable; and sending the HTML page to an HTTP daemon of the network packet router.

7. The method of claim 1, further comprising the step of creating and storing an executable software element in association with the Web browser, wherein the executable software element is configured for packaging an SNMP query into the request from the Web browser.

8. The method of claim 1, wherein the step of receiving a request from the Web browser to obtain the current value of the MIB variable includes the step of unpackaging an SNMP query that is packaged in the request from the Web browser to identify the MIB variable.

9. The method of claim 8, further comprising the step of sending the SNMP query to an SNMP daemon of the network packet router.

10. The method of claim 8, wherein the step of returning the current value of the MIB variable to the Web browser includes the step of repackaging the current value of the MIB variable into an HTTP reply message.

11. A network device, comprising:
a processor;
a Management Information Base (MIB) logically accessible by the processor and comprising one or more stored values of MIB variables;
a Simple Network Management Protocol (SNMP) daemon executed by the processor;
a Hypertext Transfer Protocol (HTTP) daemon executed by the processor;
stored instructions for obtaining a current value of a Management Information base (MIB) variable stored in a managed network device network packet router which, when executed by the processor, cause the processor to carry out the steps of:
receiving a connection of a Web browser to a the network packet router;
receiving at the network packet router an HTTP request message from the browser to obtain the current value of the MIB variable from the network packet router to which the MIB variable value pertains;
creating, at the network packet router, based on the HTTP request message, an SNMP query that requests the current value of the MIB variable;
communicating the SNMP query to an SNMP daemon of the network packet router;
receiving, from the SNMP daemon in response to communicating the SNMP query to the SNMP daemon, the current value of the MIB variable from the MIB of the network packet router to which the MIB variable value pertains; and
communicating the current value of the MIB variable from the network packet router to which the MIB variable value pertains to the browser using an HTTP reply message.

12. The network device of claim 11, wherein the instructions further cause the processor to carry out the steps of:
creating and storing a MIB object tree in a memory of the network packet router;
creating an electronic document that contains a representation of one or more MIB variables of the MIB object tree;
communicating the electronic document to the Web browser.

13. The network device of claim 11, wherein the step of receiving the current value of the MIB variable from the MIB of the network packet router includes the steps of creating and storing a MIB object tree in a memory of the network packet router; obtaining the MIB variable from the MIB object tree in the memory of the network packet router.

14. The network device of claim 11, wherein the instructions further cause the processor to carry out the steps of:
creating and storing a MIB object tree in a memory of the network packet router;
creating an electronic document that contains a representation of one or more MIB variables of the MIB object tree;
receiving a user selection of one of the MIB variables based on the electronic document;
wherein the step of receiving the current value of the MIB variable from the MIB of the network packet router includes the step of obtaining the MIB variable that is identified in the user selection from the MIB object tree in the memory of the network packet router.

15. The network device of claim 11, further comprising an HTTP-SNMP interface which, when executed by the processor, causes the processor to carry out the steps of:
receiving the HTTP request message to obtain the current value of the MIB variable at an HTTP-SNMP interface;
creating an SNMP query that requests a current value of the MIB variable based on the HTTP request message; and
communicating the SNMP query to an SNMP daemon of the network packet router.

16. The network device of claim 11, further comprising the steps of:
communicating the current value of the MIB variable to an HTTP-SNMP interface;
creating and storing an HTML page that contains the current value of the MIB variable; and
sending the HTML page to the HTTP daemon.

17. A computer-readable storage medium storing one or more sequences of one or more instructions for obtaining a current value of a Management Information base (MIB) variable stored in a managed network device in a network packet router, the one or more sequences of one or more instructions including instructions which, when executed by one or more processors, cause the one or more processors to perform the steps of:
receiving a connection of a Web browser to a network packet router;
receiving at the network packet router an HTTP request message from the browser to obtain the current value of the MIB variable from the network packet router to which the MIB variable value pertains;
creating, at the network packet router, based on the HTTP request message, an SNMP query that requests the current value of the MIB variable;
communicating the SNMP query to an SNMP daemon of the network packet router;
receiving, from the SNMP daemon in response to communicating the SNMP query to the SNMP daemon, the current value of the MIB variable from the MIB of the network packet router to which the MIB variable value pertains; and
communicating the current value of the MIB variable from the network packet router to which the MIB variable value pertains-to the browser using an HTTP reply message.

18. The computer-readable storage medium as recited in claim 17, wherein the instructions further cause the processor to carry out the steps of:
creating and storing a MIB object tree;
creating an electronic document that contains a representation of one or more MIB variables of the MIB object tree;
communicating the electronic document to the Web browser.

19. The computer-readable storage medium as recited in claim 17, wherein receiving the current value of the MIB variable from the MIB of the network packet router includes the steps of creating and storing a MIB object tree in a memory of the network packet router; obtaining the MIB variable from the MIB object tree in the memory of the network packet router.

20. The computer-readable storage medium as recited in claim 17, wherein the instructions further cause the processor to carry out the steps of:
   creating and storing a MIB object tree in a memory of the network packet router;
   creating an electronic document that contains a representation of one or more MIB variables of the MIB object tree;
   receiving a user selection of one of the MIB variables based on the electronic document;
   wherein receiving the current value of the MIB variable from the MIB of the network packet router includes the step of obtaining the MIB variable that is identified in the user selection from the MIB object tree in the memory of the network packet router.

21. The computer-readable storage medium as recited in claim 17, wherein the instructions further cause the processor to carry out the steps of:
   receiving the HTTP request message to obtain the current value of the MIB variable at an HTTP-SNMP interface;
   creating an SNMP query that requests a current value of the MIB variable based on the HTTP request message; and
   communicating the SNMP query to an SNMP daemon of the network packet router.

22. The computer-readable storage medium as recited in claim 17, wherein the instructions further cause the processor to carry out the steps of:
   communicating the current value of the MIB variable to an HTTP-SNMP interface;
   creating and storing an HTML page that contains the current value of the MIB variable; and
   sending the HTML page to an HTTP daemon of the network packet router.

23. An apparatus comprising:
   one or more processors; and
   a computer-readable storage medium storing a HTTP browser program including a plug-in executable software element configured for obtaining a current value of a Management Information Base (MIB) variable stored in a network packet router and which, when executed by the one or more processors, causes the one or more processors to perform:
   connecting the browser to the network packet router;
   translating an SNMP query to a HTTP request message;
   communicating the HTTP request message from the browser to the network packet router to obtain the current value of the MIB variable from the network packet router to which the MIB variable value pertains;
   wherein communicating the HTTP request message to the network packet router causes the network packet router to (a) create, based on the HTTP request message, an SNMP query that requests the current value of the MIB variable and (b) communicate the SNMP query to an SNMP daemon of the network packet router to obtain the current value of the MIB variable;
   receiving, in an HTTP reply message, the current value of the MIB variable from the MIB of the network packet router to which the MIB variable value pertains; and
   displaying the current value of the MIB variable using the browser.

24. An apparatus comprising:
   one or more processors; and
   a computer-readable storage medium storing an applet executable in a browser program and configured for obtaining a current value of a Management Information Base (MIB) variable stored in a managed network device packet router in a network and which, when executed by the one or more processors, causes the one or more processors to perform:
   connecting the browser to the network packet router;
   translating an SNMP query to a HTTP request message;
   communicating the HTTP request message from the browser to the network packet router to obtain the current value of the MIB variable from the network packet router to which the MIB variable value pertains;
   wherein communicating the HTTP request message to the network packet router causes the network packet router to (a) create, based on the HTTP request message, an SNMP query that requests the current value of the MIB variable and (b) communicate the SNMP query to an SNMP daemon of the network packet router to obtain the current value of the MIB variable;
   receiving, in an HTTP reply message, the current value of the MIB variable from the MIB of the network packet router to which the MIB variable value pertains; and
   displaying the current value of the MIB variable using the browser.

25. The network device of claim 11, wherein the step of receiving a request from the Web browser to obtain the current value of the MIB variable includes the step of unpackaging an SNMP query that is packaged in the request from the Web browser to identify the MIB variable.

26. The network device of claim 25, wherein the instructions further cause the processor to carry out the step of sending the SNMP query to an SNMP daemon of the network packet router.

27. The network device of claim 25, wherein the step of returning the current value of the MIB variable to the Web browser includes the step of repackaging the current value of the MIB variable into an HTTP reply message.

28. The computer-readable storage medium of claim 17, wherein the step of receiving a request from the Web browser to obtain the current value of the MIB variable includes the step of unpackaging an SNMP query that is packaged in the request from the Web browser to identify the MIB variable.

29. The computer-readable storage medium of claim 28, wherein the instructions further cause the processor to carry out the step of sending the SNMP query to an SNMP daemon of the network packet router.

30. The computer-readable storage medium of claim 28, wherein the step of returning the current value of the MIB variable to the Web browser includes the step of repackaging the current value of the MIB variable into an HTTP reply message.

31. A system for obtaining a current value of a Management Information base (MIB) variable stored in a managed network device in a network packet router, the system comprising:
   means for receiving a connection of a Web browser to a network packet router;
   means for receiving at the network packet router an HTTP request message from the browser to obtain the current value of the MIB variable from the network packet router to which the MIB variable value pertains;
   means for creating, at the network packet router, based on the HTTP request message, an SNMP query that requests the current value of the MIB variable;

means for communicating the SNMP query to an SNMP daemon of the network packet router;

means for receiving, from the SNMP daemon in response to communicating the SNMP query to the SNMP daemon, the current value of the MIB variable from the MIB of the network packet router to which the MIB variable value pertains; and means for communicating the current value of the MIB variable from the network packet router to which the MIB variable value pertains to the browser using an HTTP reply message.

32. The system of claim 31, further comprising:

means for creating and storing a MIB object tree in a memory of the network packet router;

means for creating an electronic document that contains a representation of one or more MIB variables of the MIB object tree;

means for communicating the electronic document to the Web browser.

33. The system of claim 31, wherein the means for receiving the current value of the MIB variable from the MIB of the network packet router includes means for creating and storing a MIB object tree in a memory of the network packet router;

means for obtaining the MIB variable from the MIB object tree in the memory of the network packet router.

34. The system of claim 31, further comprising:

means for creating and storing a MIB object tree in a memory of the network packet router;

means for creating an electronic document that contains a representation of one or more MIB variables of the MIB object tree;

means for receiving a user selection of one of the MIB variables based on the electronic document;

wherein the means for receiving the current value of the MIB variable from the MIB of the network packet router includes means for obtaining the MIB variable that is identified in the user selection from the MIB object tree in the memory of the network packet router.

35. The system of claim 31, further comprising:

means for receiving the HTTP request message to obtain the current value of the MIB variable at an HTTP-SNMP interface;

means for creating an SNMP query that requests a current value of the MIB variable based on the HTTP request message; and means for communicating the SNMP query to an SNMP daemon of the network packet router.

36. The system of claim 31, further comprising:

means for communicating the current value of the MIB variable to an HTTP-SNMP interface;

means for creating and storing an HTML page that contains the current value of the MIB variable; and means for sending the HTML page to an HTTP daemon of the network packet router.

37. The system of claim 31, further comprising:

means for creating and storing an executable software element in association with the Web browser, wherein the executable software element is configured for packaging an SNMP query into the request from the Web browser.

38. The system of claim 31, wherein the means for receiving a request from the Web browser to obtain the current value of the MIB variable includes means for unpackaging an SNMP query that is packaged in the request from the Web browser to identify the MIB variable.

39. The system of claim 38, further comprising means for sending the SNMP query to an SNMP daemon of the network packet router.

40. The system of claim 38, wherein the means for returning the current value of the MIB variable to the Web browser includes means for repackaging the current value of the MIB variable into an HTTP reply message.

41. The method of claim 1, wherein the step of receiving a connection comprises receiving a connection to an HTTP daemon in the network packet router, and wherein the step of receiving an HTTP request message comprises receiving an HTTP request message at the HTTP daemon.

42. The network device of claim 11, wherein the instructions cause the processor to carry out the step of receiving a connection by receiving a connection to an HTTP daemon in the network packet router and the step of receiving an HTTP request message by receiving an HTTP request message at the HTTP daemon.

43. The computer-readable storage medium of claim 17, wherein the instructions cause the one or more processors to perform the step of receiving a connection by receiving a connection to an HTTP daemon in the network packet router and the step of receiving an HTTP request message by receiving an HTTP request message at the HTTP daemon.

44. The system of claim 31, wherein the means for receiving a connection comprises means for receiving a connection to an HTTP daemon in the network packet router, and wherein the means for receiving an HTTP request message comprises means for receiving an HTTP request message at the HTTP daemon.

* * * * *